No. 767,852. PATENTED AUG. 16, 1904.
Z. H. TIBBETTS.
DENTAL MATRIX.
APPLICATION FILED MAR. 5, 1904.
NO MODEL.
FIG. I
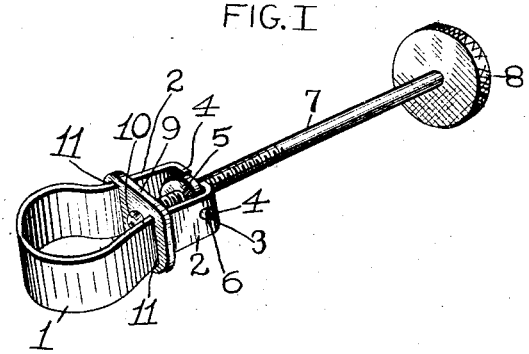
FIG. II.
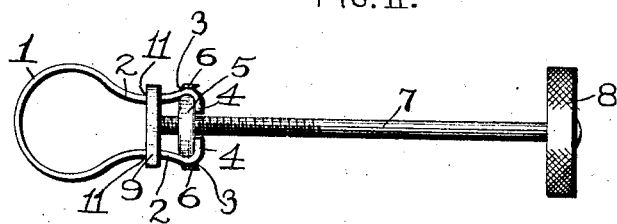
FIG. III.
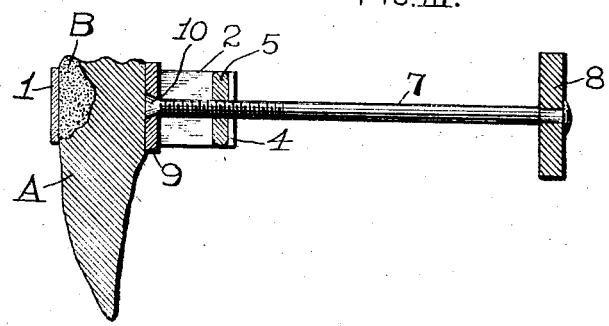
ATTEST.
H. J. Fletcher.
Blanche Hogan
INVENTOR.
Z. H. TIBBETTS.
BY.
ATTYS.

No. 767,852.

Patented August 16, 1904.

UNITED STATES PATENT OFFICE.

ZEPH H. TIBBETTS, OF HIGHLAND, ILLINOIS.

DENTAL MATRIX.

SPECIFICATION forming part of Letters Patent No. 767,852, dated August 16, 1904.

Application filed March 5, 1904. Serial No. 196,646. (No model.)

*To all whom it may concern:*

Be it known that I, ZEPH H. TIBBETTS, a citizen of the United States, residing in Highland, in the county of Madison and State of Illinois, have invented certain new and useful Improvements in Dental Matrices, of which the following is a full, clear, and exact description, reference being had to the accompanying drawings, forming part of this specification.

My invention relates to a matrix for application to teeth in dental operations to confine the filling introduced into cavities in the teeth during the act of filling them.

The invention consists in features of novelty hereinafter fully described, and pointed out in the claim.

Figure I is a perspective view of my matrix. Fig. II is a top or bottom view of the matrix. Fig. III is a longitudinal section of the matrix shown applied to a tooth having a filling embedded therein.

1 designates a loop-band, that has arms 2, provided with apertures 3 and terminating in tongues 4, that extend inwardly toward each other at angles to the main portions of the band.

5 is a head that is provided with a central screw-threaded opening and which carries a pair of prongs 6, that pass through the loop-arm apertures 3 and serve to hold the band to said head. The prongs 6 are preferably inclined rearwardly from the edges of the head 5, as seen most clearly in Fig. II, in order that the band-arms may be more effectually held thereon.

7 is a screw-rod that operates in the screw-threaded opening of the head 5 and is provided at its outer end with a knob 8, by which the rod is turned.

9 is a clamp-plate in the center of which the inner end of the screw-rod 7 is swiveled, as seen at 10, Fig. III. This clamp-plate is provided with a pair of slots 11, (see Fig. I,) in which the arms 2 of the band 1 are positioned, so that when the clamp-plate is reciprocated upon rotation of the screw-rod it will travel on the band-arms.

In the practical use of my matrix the loop-band 1 is applied to a tooth, as indicated at A, Fig. III, so as to encircle the cavity therein that is to receive the filling B. The screw-rod 7 is then rotated to cause forward movement of the clamp-plate 10 to the tooth, during which action the screw-rod turns in the head 5, that serves to hold the band-arms rearwardly. When the clamp-plate becomes pressed tightly to the tooth, the loop of the band becomes tightly drawn around the tooth and will remain in such condition while the cavity in the tooth is being filled.

I claim as my invention—

In a dental matrix, the combination of a loop-band having arms, a head provided with a screw-threaded opening, prongs carried by said head and passing through said band-arms, a clamp-plate slidably fitted within said band-arms immediately around the tooth and a screw-rod operating in said head and having connection with said clamp-plate, substantially as set forth.

ZEPH H. TIBBETTS.

In presence of—
CHAS. F. TUFFLI,
CHAS. T. WEST.